United States Patent [19]

Takamiya et al.

[11] Patent Number: 4,697,469

[45] Date of Patent: Oct. 6, 1987

[54] STEPLESS SPEED CHANGE DEVICE

[75] Inventors: Kikuzo Takamiya, Kitamoto; Hideyuki Ishibashi; Kunitoshi Kozakae, both of Ageo, all of Japan

[73] Assignee: Bridgestone Cycle Co., Ltd., Japan

[21] Appl. No.: 844,108

[22] Filed: Mar. 26, 1986

[30] Foreign Application Priority Data

Apr. 1, 1985 [JP] Japan ................................. 60-66613

[51] Int. Cl.⁴ ............................................. F16H 23/04
[52] U.S. Cl. ......................................... 74/117; 74/63; 74/594.1
[58] Field of Search ................. 74/594.1, 594.2, 594.3, 74/567, 568 R, 569, 117, 63; 474/6 G, 70; 280/236, 261; 192/64

[56] References Cited

U.S. PATENT DOCUMENTS

| 778,147 | 12/1904 | Ritscher | 74/594.3 |
|---|---|---|---|
| 1,211,911 | 1/1917 | Boyd | 74/594.3 |
| 2,081,373 | 5/1937 | Viscasillas | 74/117 |
| 2,166,565 | 7/1939 | Broluska | 74/594.1 |
| 2,568,937 | 9/1951 | Stueland | 74/117 |
| 3,135,368 | 6/1964 | Shimano | 74/750 B |
| 3,351,165 | 11/1967 | Shimano | 74/750 B |
| 3,366,206 | 1/1968 | Shimano | 74/750 B |
| 3,432,013 | 3/1969 | Matsumoto | 74/750 B |
| 3,722,305 | 3/1973 | Walters et al. | |
| 3,806,014 | 4/1974 | Bolli | 74/63 |
| 3,868,860 | 3/1975 | Ishimi | |
| 3,874,253 | 4/1975 | Waddington | |
| 4,098,147 | 7/1978 | Waddington | |
| 4,181,043 | 1/1980 | Waddington | 74/750 B |
| 4,277,986 | 7/1981 | Waddington | 74/750 B |
| 4,283,969 | 8/1981 | Lapeyre | |
| 4,299,581 | 11/1981 | Korosue | |
| 4,376,394 | 3/1983 | Lapeyre | |
| 4,425,824 | 1/1984 | Koch | 74/594.2 |
| 4,475,412 | 10/1984 | Evans | 74/63 |
| 4,505,163 | 3/1985 | Falkner | |
| 4,644,828 | 2/1987 | Kozakae | 74/117 |

FOREIGN PATENT DOCUMENTS

| 2205322 | 8/1972 | Fed. Rep. of Germany . | |
| 2317061 | 10/1973 | Fed. Rep. of Germany . | |
| 1083075 | 1/1955 | France | 74/594.1 |
| 172259 | 3/1959 | Japan | 74/117 |
| 54-93754 | 7/1979 | Japan . | |
| 8200961 | 10/1983 | Netherlands | 74/594.1 |
| 412050 | 6/1934 | United Kingdom . | |

*Primary Examiner*—Gary L. Smith
*Assistant Examiner*—Vinh Luong
*Attorney, Agent, or Firm*—Parkhurst & Oliff

[57] ABSTRACT

A stepless speed change device comprising an internally toothed ratchet formed in an inner circumference of a driving rotary body, a floating ring having an inner diameter smaller than a root diameter of teeth of the internally toothed ratchet and arranged in floating condition in side-by-side relation to the internally toothed ratchet, and a plurality of pawls whose distal ends engage the teeth of the internally toothed ratchet and inscribe the floating ring. Bottoms of the pawls are pivotally connectd to a driven rotary body rotatably provided on an eccentric cam assembly whose eccentricity is adjustable.

2 Claims, 4 Drawing Figures

FIG_3

STEPLESS SPEED CHANGE DEVICE

BACKGROUND OF THE INVENTION

This invention relates to a stepless speed change device capable of changing rotating speeds in stepless manner with the aid of pawls engaging internally toothed ratchets and particularly suitable for use in bicycles.

Such a kind of speed change device has been proposed, for example, as disclosed in Japanese Patent Application Publication No. 1,722/59.

In the device of the prior art, however, there has been a problem that noise occurs when pawls and teeth of internally toothed ratchet slidingly contact.

SUMMARY OF THE INVENTION

It is a primary object of the invention to provide a stepless speed change device which considerably reduces the noise produced in accelerating a speed change device to solve the problem of the prior art.

In order to achieve this object, according to the invention a stepless speed change device comprises an internally toothed ratchet formed in an inner circumference of a driving rotary body, a floating ring having an inner diameter smaller than a root diameter of teeth of said internally toothed ratchet and arranged in floating condition in side-by-side relation to said internally toothed ratchet, and a plurality of pawls whose distal ends engage said teeth of said internally toothed ratchet and inscribe said floating ring, bottoms of said pawls being pivotally connected to a driven rotary body rotatably provided on an eccentric cam assembly whose eccentricity is adjustable, thereby deriving output at the driven rotary body.

According to the invention, the eccentric cam assembly consists of an inner eccentric cam substantially in the form of a cylinder and an outer eccentric cam substantially in the form of a cylinder snugly rotatably fitted on the inner eccentric cam, the inner and outer eccentric cams being rotated relative to each other to change the eccentricity of the cam assembly.

In a preferred embodiment, the inner eccentric cam eccentrically fixed to a spindle for a rear wheel hub and the driving rotary body is formed with a sprocket driven by a chain of a bicycle. The driven rotary body is made as a carrier consisting of a small diameter cylinder and a large diameter cylinder integrally formed, the small diameter cylinder being rotatably fitted on the outer eccentric cam and the large diameter cylinder being arranged in a hollow cylindrical casing formed integrally with the rear wheel hub. The large diameter cylinder of the carrier is formed in an inner circumference with a further internally toothed ratchet, and further provided a further floating ring having an inner diameter smaller than a root diameter of teeth of the further internally toothed ratchet and arranged in floating condition in side-by-side relation to the further internally toothed ratchet, and a plurality of further pawls whose distal ends engage the teeth of the further internally toothed ratchet and inscribe the further floating ring, bottoms of the further pawls being pivotally connected to a hub end of the rear wheel hub.

According to the invention, the floating ring having an inner diameter smaller than a root diameter of an inner ratchet is floatingly arranged in side-by-side relation to the internally toothed ratchet and pawls are adapted to engage the internally toothed ratched and to inscribe the floating ring. With the arrangement, the sliding contact between distal ends of idle pawls and teeth of the internally toothed ratchet is prevented as much as possible to considerably reduced the noise.

The invention will be more fully understood by referring to the following detailed specification and claims taken in connection with the appended drawings.

DETAILED DESCRIPTION OF THE PREFERRED EMBODIMENT

Figure 1:
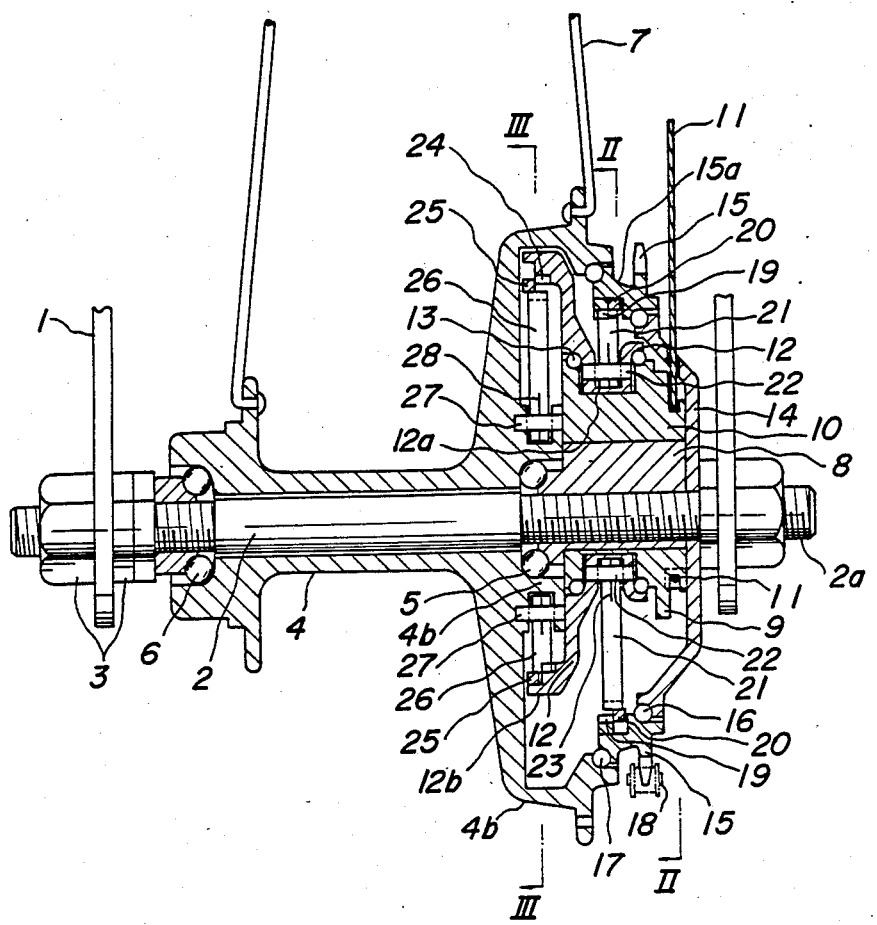
FIG. 1 is a sectional view of a device according to the invention.
Figure 2:
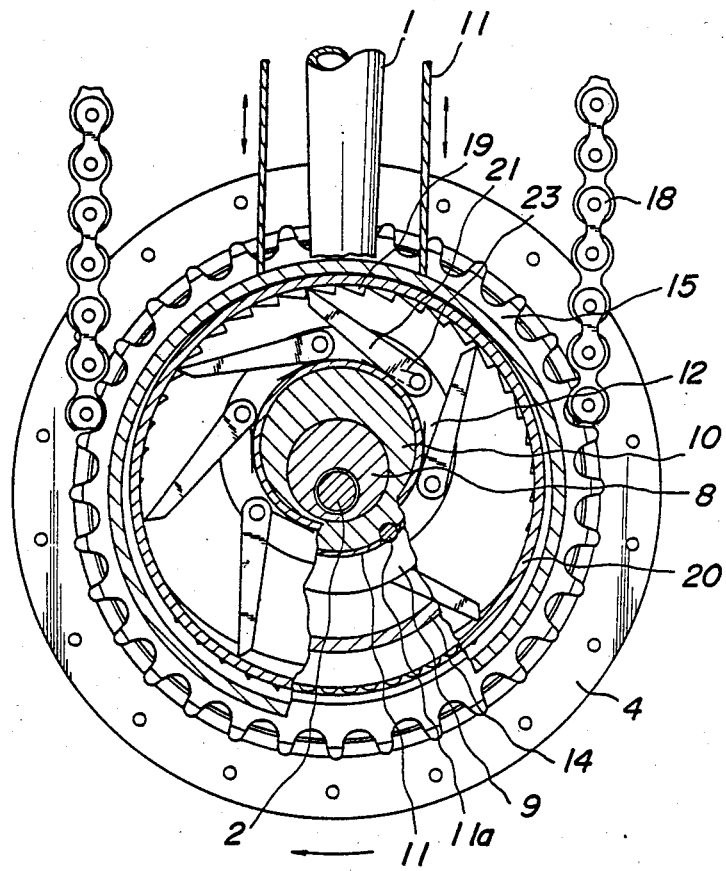
FIG. 2 is a sectional view of device taken along the line II—II in FIG. 1.
Figure 3:
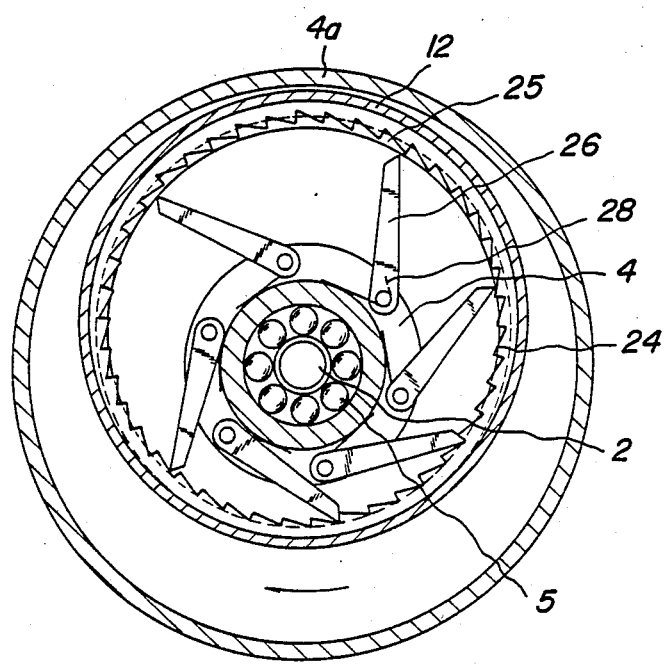
FIG. 3 is a sectional view of the device taken along the line III—III in FIG. 1.

FIGS. 1-3 illustrate a stepless speed change device of one embodiment of the invention, with chain stays 1, a hub spindle 2 for a rear wheel fixed to the chain stays 1 by means of lock nuts 3, a rear wheel hub 4 rotatably mounted on the spindle 2 by means of bearings 5 and 6, and spokes 7.

In this embodiment, the spindle 2 for the rear wheel is formed with a screw-threaded portion 2a to which is fixed an inner eccentric cam 8 threadedly engaged thereon. On the inner eccentric cam 8 is rotatably fitted on outer eccentric cam 10 integrally formed with a wire reel 9 about which is wound an operating wire 11 having ends 11a (FIG. 2).

Moreover, a carrier 12 comprises a small diameter cylinder 12a and a large diameter cylinder 12b integrally formed so that the small diameter cylinder 12a is fitted on the outer eccentric cam 10 by means of bearings 13 and the large diameter cylinder 12b is arranged in a hollow cylindrical casing 4a formed integrally with the rear wheel hub 4.

A dish-shaped casing 14 is fixed to the spindle 2 by means of the inner eccentric cam 8 and the lock nut 3. An internally toothed sprocket 15 for the rear wheel includes a cylindrical portion 15a integral therewith and is rotatably arranged between the casing 14 and the rear wheel hub 4 with the aid of bearings 16 and 17. Reference numeral 18 denotes a chain.

The cylindrical portion 15a of the sprocket 15 is formed with an inner ratchet 19. A floating ring 20 having an inner diameter smaller than a root diameter of the internally toothed ratchet 19 is arranged in floating condition in side-by-side relation to the internally toothed ratchet 19. Bottoms of a plurality (six in this embodiment) of pawls 21 are pivotally connected to the small diameter cylinder 12a of the carrier 12 by means of pins 22 so that the pawls 21 are adapted to engage the inner ratchet 19 and to inscribe the floating ring 20. Springs 23 always urge front ends of the pawls 21 against the internally toothed ratchet 19.

The large diameter cylinder 12b of the carrier 12 is formed in an inner circumference with internally toothed ratchet 24. A floating ring 25 having an inner diameter smaller than a root diameter of the internally toothed ratchet 24 is arranged in floating condition in side-by-side relation to the internally toothed ratchet 24. Bottoms of a plurality (six in this embodiment) of pawls 26 are pivotally connected to a hub end 4b of the rear wheel hub 4 in the casing 4a by means of pins 27 so that the pawls 26 are adapted to engage the internally toothed ratchet 24 and to inscribe the floating ring 25. Springs 28 always urge front ends of the pawls 26 against the ratchet 24.

The operation of the device constructed as above described according to the invention will be explained hereinafter. Referring to FIGS. 1-3 when a crank gear (not shown) is rotated by a crank pedal (not shown), the rotation is transmitted to the sprocket 15 through the chain 18. The rotation of the sprocket 15 is transmitted to the ratchet 19 and then to the carrier 12 through the pawls 21 and the pins 22. The rotation of the carrier 12 causes the internally toothed ratchet 24, as the result of which, the rear wheel hub 4 is rotated through the pawls 26 and the pins 27.

In other words, in this device, the rotation is transmitted through the first speed change means including the pawls 21 and the second speed change means including the pawls 26.

FIGS. 1 and 3 illustrate the outer eccentric cam 10 in the maximum eccentric position. When the outer eccentric cam 10 is rotated through 180° by operating the operating wire 11, an outer circumferential surface becomes concentric to the spindle 2. Under such a condition, when these driving rotary bodies 15a, 12b are rotated, the respective internally toothed ratchets and the pawls are rotated in unison, so that the speed change ratio is 1:1.

Figure 4:
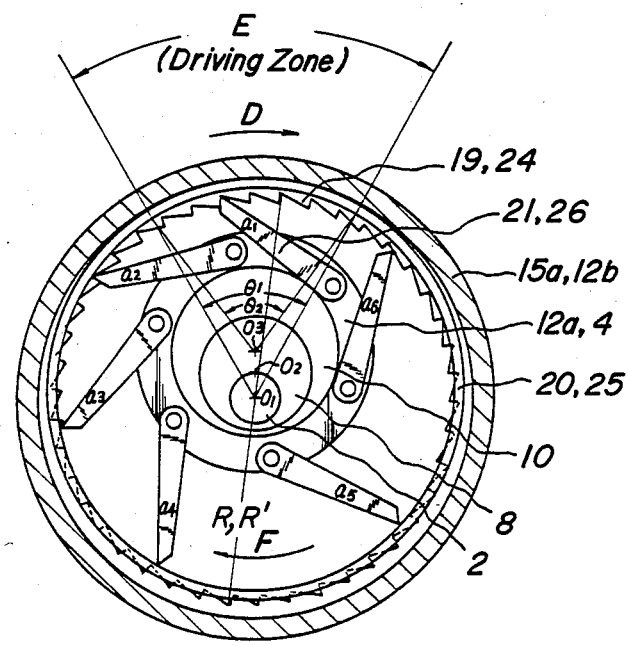
FIG. 4 is an explanatory view for explaining the operation of the device shown in FIG. 1.

FIG. 4 is a view for explaining the operation of the pawls, ratchet and floating ring. As the constitutions of the two speed change means are identical with each other, the further explanation will effected by referring to FIG. 4.

When the outer eccentric cam 10 is rotated by the operating wire 11 to the maximum eccentric position, the rotation of the driving rotary members (15a, 12b) in a direction shown by an arrow D is transmitted to the driven rotary bodies (12a, 4) through the internally toothed ratchets 19 and 24 and the pawls 21 and 26.

When the outer eccentric cam 10 is eccentric, the speed-up ratio by the pawl $a_1$ positioned in the driving zone E in FIG. 4 is the largest. (As the pawls are six, the driving zone E is a sector having an angle of 60° which is obtained by dividing 360° by six). Accordingly, the driven rotary bodies (12a, 4) are driven increasing its rotary speed by the pawl $a_1$. The other pawls are rotated sliding in a direction shown by an arrow F relative to teeth of the respective ratchets 19 and 24.

When the pawl $A_1$ moves out of the driving zone E and the pawl $a_2$ enters the driving zone E, the driven rotary bodies (12a, 4) are driven increasing its rotating speed by the pawl $a_2$. In this manner, the pawl for transmitting the rotation progressively changes in the sequence of $a_3$, $a_4$, $a_5$ and $a_6$.

In this case, the speed change ratio (speed up ratio is a ratio of an angle $\theta_1$ of a driving zone of the pawls around the center $O_1$ of the spindle 2 to an angle $\theta_2$ of a driving zone of the pawls around the center $O_3$ of the outer eccentric cam 10.

As above descibed, the pawls in the driving zone E is slidingly brought into contact with teeth of the internally toothed ratchet, so that distal ends of the pawls collide with the teeth to produce noise every time when the distal ends of the pawls move beyond the teeth. To avoid this, according to the invention, the floating ring 20 or 25 is provided, so that the floating ring 20 or 25 is moved into an eccentric position by the pawl in the driving zone, so that an inner surface of the floating ring in the driving zone E becomes coincident with a root surface of the internally toothed ratchet 19 or 24 as shown in FIG. 4. As a result, distal ends of the idle pawl $a_4$ and $a_5$ are floatingly supported by the floating ring 20 or 25 on an inner side of a tooth crest circle of the ratchet 19 or 24, so that there is no interference of the distal ends of the pawls with the internally toothed ratchet as shown in FIG. 4. Accordingly, the noise caused between the internally toothed ratchet and the pawls is eliminated.

In this case, moreover, although the pawls $a_3$ and $a_6$ may interfere with the teeth of the internally toothed ratchet, the pawl $a_3$ interferes with only small parts of the teeth of the ratchet, so that the distal end of the pawl $a_3$ radially moves only by slight distance toward the floating ring at the moment the distal end moves beyond the crests of teeth of the internally toothed ratchet scarcely producing noise. Although the pawl $a_6$ somewhat interferes with the teeth of the internally toothed ratchet, the floating ring mildly catches the distal end of the pawl 6 because of the floating condition of the ring, without producing any noise. These acts have been ascertained in actual experiments.

Moreover, although the invention has been explained with the internally toothed ratchet and the pawls in a single row, it may be applicable to those in double rows.

As can be seen from the above explanation, according to the invention, the floating ring having an inner diameter smaller than a root diameter of an internally toothed ratchet is floatingly arranged in side-by-side relation to the internally toothed ratchet and pawls are adapted to engage the inner ratchet and to inscribe the floating ring. With this arrangement, the interference between distal ends of idle pawls and teeth of the internally toothed ratchet is prevented as much as possible and noise is considerably reduced with the aid of the floating effect of the floating ring.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a stepless speed change device including an internally toothed ratchet formed in an inner circumference of a driving rotary body, and a plurality of pawls whose distal end engage said teeth of said internally toothed ratchet and bottoms of said pawls being pivotally connected to a driven rotary body rotatably provided on an eccentric cam assembly whose eccentricity is adjustable, thereby deriving output at the driven rotary body, said eccentric cam assembly consisting of an inner eccentric cam substantially in the form of a cylinder and an outer eccentric cam substantially in the form of a cylinder snugly rotatably fitted on said inner eccentric cam, said inner and outer eccentric cams being rotated relative to each other to change the eccentricity of the cam assembly, the improvement comprising a floating ring having an inner diameter smaller than a root diameter of teeth of said internally toothed ratchet and arranged in floating condition in side-by-side relation to said internally toothed ratchet and permitting said distal ends of said pawls to inscribe said floating ring.

2. A device as set forth in claim 1, wherein said inner eccentric cam eccentrically fixed to a spindle for a rear wheel hub and said driving rotary body is formed with a sprocket driven by a chain of a bicycle, wherein said driven rotary body is made as a carrier consisting of a small diameter cylinder and a large diameter cylinder integrally formed, said small diameter cylinder being rotatably fitted on said outer eccentric cam and said large diameter cylinder being arranged in a hollow cylindrical casing formed integrally with said rear wheel hub, wherein said large diameter cylinder of said carrier is formed in an inner circumference with a further internally toothed ratchet, and further provided a further floating ring having an inner diameter smaller than a root diameter of teeth of said further internally toothed ratchet and arranged in floating condition in side-by-side relation to said further internally toothed ratchet, and a plurality of further pawls whose distal ends engage said teeth of said further internally toothed ratchet and inscribe said further floating ring, bottoms of said further pawls being pivotally connected to a hub end of said rear wheel hub.

* * * * *